US011665670B2

(12) United States Patent
Yu et al.

(10) Patent No.: US 11,665,670 B2
(45) Date of Patent: May 30, 2023

(54) METHOD AND APPARATUS FOR TRANSMISSION RESOURCE SELECTION

(71) Applicant: Lenovo (Beijing) Limited, Beijing (CN)

(72) Inventors: Xiaodong Yu, Beijing (CN); Haipeng Lei, Beijing (CN); Zhi Yan, Beijing (CN); Chenxi Zhu, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 71 days.

(21) Appl. No.: 16/764,653

(22) PCT Filed: Nov. 16, 2017

(86) PCT No.: PCT/CN2017/111416
§ 371 (c)(1),
(2) Date: May 15, 2020

(87) PCT Pub. No.: WO2019/095226
PCT Pub. Date: May 23, 2019

(65) Prior Publication Data
US 2020/0288433 A1 Sep. 10, 2020

(51) Int. Cl.
*H04W 72/04* (2023.01)
*H04W 72/12* (2023.01)
(Continued)

(52) U.S. Cl.
CPC ............. *H04W 72/02* (2013.01); *H04W 4/40* (2018.02); *H04W 72/0446* (2013.01); *H04W 72/0453* (2013.01); *H04W 72/10* (2013.01); *H04W 92/18* (2013.01)

(58) Field of Classification Search
None
See application file for complete search history.

(56) References Cited

U.S. PATENT DOCUMENTS

2012/0120910 A1* 5/2012 Mazzarese ............ H04L 5/0092 370/330
2016/0073408 A1* 3/2016 Sartori .............. H04W 72/0453 370/329
(Continued)

FOREIGN PATENT DOCUMENTS

CN 105451211 A 3/2016
CN 106063352 A 10/2016
(Continued)

OTHER PUBLICATIONS

Ericsson, Support for smaller resource reservation periods in V2X, 3GPP TSG RAN WG1 Meeting #86bis, R1-1609734, Oct. 10-14, 2016, pp. 1-6, Lisbon, Portugal.
(Continued)

*Primary Examiner* — Sai Aung
(74) *Attorney, Agent, or Firm* — Kunzler Bean & Adamson

(57) ABSTRACT

The present disclosure is directed to a method and apparatus for transmission resource selection. According to an embodiment of the present disclosure, a method includes: selecting a transmission resource for a sidelink transmission; generating an indication signaling for indicating the sidelink transmission on the selected transmission resource; and transmitting the indication signaling on a detection resource, which is a time-frequency resource prior to the selected transmission resource. Embodiments of the present disclosure solve the technical problem concerning the transmission resource selection in a V2X system.

10 Claims, 5 Drawing Sheets

(51) Int. Cl.

| | |
|---|---|
| ***H04W 72/02*** | (2009.01) |
| ***H04W 4/40*** | (2018.01) |
| ***H04W 72/0446*** | (2023.01) |
| ***H04W 72/0453*** | (2023.01) |
| ***H04W 72/10*** | (2009.01) |
| *H04W 92/18* | (2009.01) |

(56) References Cited

U.S. PATENT DOCUMENTS

| | | | | |
|---|---|---|---|---|
| 2017/0295601 | A1* | 10/2017 | Kim | H04W 72/0406 |
| 2018/0014174 | A1* | 1/2018 | Zhou | H04W 48/16 |
| 2018/0049260 | A1* | 2/2018 | Aminaka | H04W 72/048 |
| 2018/0092085 | A1* | 3/2018 | Shaheen | H04W 36/0022 |
| 2019/0075548 | A1* | 3/2019 | Lee | H04W 72/044 |
| 2020/0288433 | A1* | 9/2020 | Yu | H04W 72/02 |
| 2020/0296690 | A1* | 9/2020 | Lee | H04W 4/40 |

FOREIGN PATENT DOCUMENTS

| | | | |
|---|---|---|---|
| CN | 106068668 | A | 11/2016 |
| CN | 106256157 | A | 12/2016 |
| CN | 106470492 | A | 3/2017 |
| WO | 2017028699 | A1 | 2/2017 |

OTHER PUBLICATIONS

PCT/CN2017/111416, "International Search Report and the Written Opinion of the International Search Authority" ISA/CN, State Intellectual Property Office of the P.R. China, Jul. 18, 2018, pp. 1-8.

* cited by examiner

METHOD AND APPARATUS FOR TRANSMISSION RESOURCE SELECTION

TECHNICAL FIELD

The present disclosure is directed to wireless communication technology, and more specifically relates to the technology about transmission resource selection.

BACKGROUND

As intelligent traffic system and wireless communication technology develop, V2X (vehicle to everything) has been introduced in 5G wireless communication technology. According to "Study on enhancement of 3GPP support for 5G V2X in V2X services" proposed in 3GPP TR 22.886 V15.1.0, the following two sets of platooning performances requirements should be supported.

According to set 1, the distance between vehicles for normal density platooning may be larger than 2 meters. When the platoon moves at 100 km/h, vehicles move 1 meter in 36 ms. Considering the round-trip-time and processing delay, message transmission frequency up to 40 Hz, translating into 25 ms end-to-end latency with message sizes of around 300-400 bytes should be supported.

According to set 2, the distance between vehicles for high density platooning is 1 meter. When the platoon moves at 100 km/h, vehicles move 1 meter in 36 ms. Considering round-trip-time and processing delay, message transmission frequency up to 100 Hz, translating into at least 10ms latency with message sizes of around 50-1200 bytes should be supported.

Although in LTE (Long Term Evolution) Rel.14, V2X supports transmission and time-frequency resource reservation period of 20 ms and 50 ms, such sensing-based semi-static transmission and time-frequency resource selection are only suitable for the periodic service. For in-periodic V2X services, such as event-triggered services including pre-crash warning message, which may be more important than periodic service mentioned in set 1 of TS 22.886, no transmission resource sensing and selection mechanism in V2X can support their latency requirement.

Thus, there is a need to improve the existing time-frequency resource sensing and selection mechanism in V2X to reduce the latency between a packet arrival at the physical layer and a selected transmission resource. Actually, that is also one objective of the work item on 3GPP (3rd Generation Partnership Project) phase-2 V2X evolution, which is approved for services at the RAN#75.

SUMMARY OF THE PRESENT DISCLOSURE

One object of the present disclosure is to provide a technical solution for transmission resource selection in V2X, which even can meet the strict latency requirement by urgent V2X services.

According to an embodiment of the present disclosure, a method includes: selecting a transmission resource for a sidelink transmission; generating an indication signaling for indicating the sidelink transmission on the selected transmission resource; and transmitting the indication signaling on a detection resource, which is a time-frequency resource prior to the selected transmission resource.

In an embodiment of the present disclosure, the method may further include transmitting the indication signaling on the last symbol of the detection resource. The indication signaling may indicate at least one of a timing offset between the transmission of the indication signaling and the sidelink transmission, a frequency offset between the transmission of the indication signaling and the sidelink transmission, the priority of the sidelink transmission, and the transmission power of the sidelink transmission. The timing offset is fixed or preconfigured by the network side.

In another embodiment of the present disclosure, the indication signaling may a reference signaling sequence. The reference signaling sequence may be a sounding reference signaling or a demodulation reference signal. The indication information of the indication signaling may be associated with the order of the reference signaling sequence.

In a further embodiment of the present disclosure, transmitting the indication signaling may further includes transmitting a power on the detection resource. The power may be associated with the priority of the sidelink transmission. Transmitting the indication signaling may further include transmitting a copy of a part of the sidelink transmission on the detection resource.

According to another embodiment of the present disclosure, the method may include monitoring a detection resource corresponding to a candidate transmission resource for a sidelink transmission to determine whether the candidate transmission resource is indicated as a transmission resource selected by another UE via a received indication signaling; determining whether the candidate transmission resource is available for the sidelink transmission based on the monitoring; selecting the candidate resource as a transmission resource for the sidelink transmission in response to the candidate transmission resource is available; and transmitting the sidelink transmission on the selected transmission resource.

In an embodiment of the present disclosure, the detection resource is a time-frequency resource prior to the candidate transmission resource. The received indication signaling may be transmitted on the last symbol of the detection resource. The received indication signaling may indicate at least one of the timing offset between the transmission of the received indication signaling and a sidelink transmission on the transmission resource selected by the other UE, frequency offset between the transmission of the received indication signaling and the sidelink transmission on the transmission resource selected by the other UE, the priority of the sidelink transmission on the transmission resource selected by the other UE, and the transmission power of the sidelink transmission on the transmission resource selected by the other UE. The timing offset may be fixed or preconfigured by the network side.

In another embodiment of the present disclosure, the received indication signaling may further include a reference signaling sequence. The reference signaling sequence may be a sounding reference signaling or a demodulation reference signal. The indication information of the received indication signaling may be associated with the order of the reference signaling sequence. The received indication signaling is a power on the detection resource. The power may be associated with the priority of the sidelink transmission on the transmission resource selected by the other UE. The received indication signaling may further include a copy of a part of the sidelink transmission on the transmission resource selected by the other UE.

In a further embodiment of the present disclosure, monitoring the detection resource may further include decoding the received indication signaling. When the decoded indication signaling indicates the candidate transmission resource is occupied by the other UE, the candidate transmission resource is determined to be unavailable. Monitoring the detection resource may further include detecting the power of the detection resource. When the detected power of the detection resource is lower than a pre-defined threshold, the candidate transmission resource is determined to be available. The pre-defined threshold may be associated with the priority of the sidelink transmission.

Embodiments of the present disclosure also provide an apparatus, which may include a processor that can perform the above methods.

Embodiments of the present disclosure solve the technical problem concerning reducing the latency between a packet arrival at the physical layer and a transmission resource selected for transmission, which can bloom V2X services.

BRIEF DESCRIPTION OF THE DRAWINGS

In order to describe the manner in which advantages and features of the present disclosure can be obtained, a description of the present disclosure is rendered by reference to specific embodiments thereof which are illustrated in the appended drawings. These drawings depict only example embodiments of the present disclosure and are not therefore to be considered to be limiting of its scope.

DETAILED DESCRIPTION

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

Figure 1:
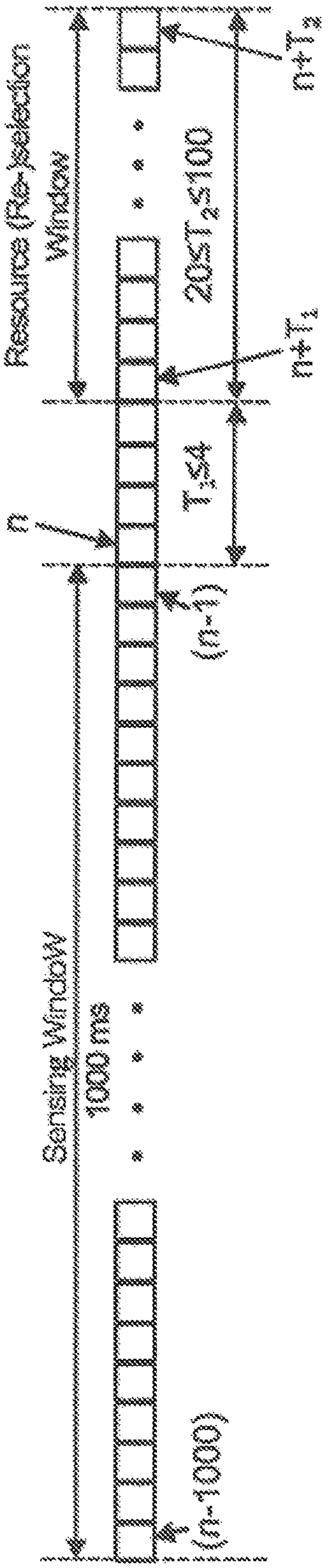
FIG. 1 illustrates a solution for V2V transmission resource selection in LTE Rel.14.

FIG. 1 illustrates a solution for V2V (vehicle to vehicle) transmission resource selection in LTE Rel.14.

As shown in FIG. 1, when requested by higher layers in subframe n, an user equipment (UE) determines a set of time-frequency resources for PSSCH (Physical Sidelink Share Channel) transmissions. The UE assumes that any time-frequency resource within the time interval $[T_n+T_1; T_n+T_2]$ corresponds to one candidate transmission resource, which may be a single subframe. Wherein, $T_n$ is the time that subframe n starts, $T_1$ is the time for necessary processing made by the UE itself, and $T_2$ is the time for transmission resource selection made by the UE. That is, the maximum time between packet arrival at the physical layer and selected transmission resource is determined by the value of $T_2$, which is also called a resource (re-)selection window. $T_2$ can vary from 20 ms to 100 ms and is subject to latency constraints.

To select a transmission resource for a sidelink transmission, the UE may monitor subframes [n-1000, n-999, . . . , n-1] within the sensing window except for those in which its transmissions occur, which is a long term sensing procedure. For example, the UE may perform the transmission resource selection based on PSCCH (Physical Sidelink Control Channel) decoding and PSSCH-RSRP (Reference Signal Receiving Power), S-RSSI (Sidelink-Receive Signal Strength Indicator) measurements in these subframes.

In order to further reduce the maximum time between the packet arrival at the physical layer and the selected transmission resource, the minimum and maximum value of $T_2$ can be further reduced, for example $T_{2min}=T_1$; $T_{2max}=10$ ms, i.e. $4 \le T_1 \le T_2 \le 10$. However, the latency requirement in a V2X system may vary from 3 ms to 100 ms. Considering an at least 4 ms processing latency by the UE itself, only further reducing the maximum time between the packet arrival at the physical layer and the selected transmission resource as provided in LTE Rel.14 still cannot meet the minimum 3 ms latency requirement in a V2X system. That is, the existing transmission selection mechanism for V2V cannot be adapted to a V2X system.

Embodiments of the present disclosure propose a solution about transmission resource selection, which can solve the technical problem concerning the latency requirement for transmission resource selection in V2X.

According to one embodiment of the present disclosure, a method for transmission resource selection may include: selecting a transmission resource for a sidelink transmission; generating an indication signaling for indicating the sidelink transmission on the selected transmission resource; and transmitting the indication signaling on a detection resource, which is a time-frequency resource prior to the selected transmission resource.

According to another embodiment of the present disclosure, a method or transmission resource selection may include: monitoring a detection resource corresponding to a candidate transmission resource for a sidelink transmission to determine whether the candidate transmission resource is indicated as a transmission resource selected by another UE via a received indication signaling; determining whether the candidate transmission resource is available for the sidelink transmission based on the monitoring; selecting the candidate resource as a transmission resource for the sidelink transmission in response to the candidate transmission resource is available; and transmitting the sidelink transmission on the selected transmission resource.

More details on the embodiments of the present disclosure will be illustrated in the following text in combination with the appended drawings.

Specifically, according to an embodiment of the present disclosure, a transmission resource selection scenario in a V2X system is proposed, wherein at least two UEs, such as a first UE and a second UE operate in the V2X system. The first UE will select a transmission resource for a sidelink transmission providing a periodic V2X service, which does not require strict latency, while the second UE will select a transmission resource for a sidelink transmission providing an in-periodic V2X service, such as a pre-crash warning message, which requires a very small latency, for example, 3 ms between a packet arrival at the physical layer and a selected transmission resource.

Figure 2:
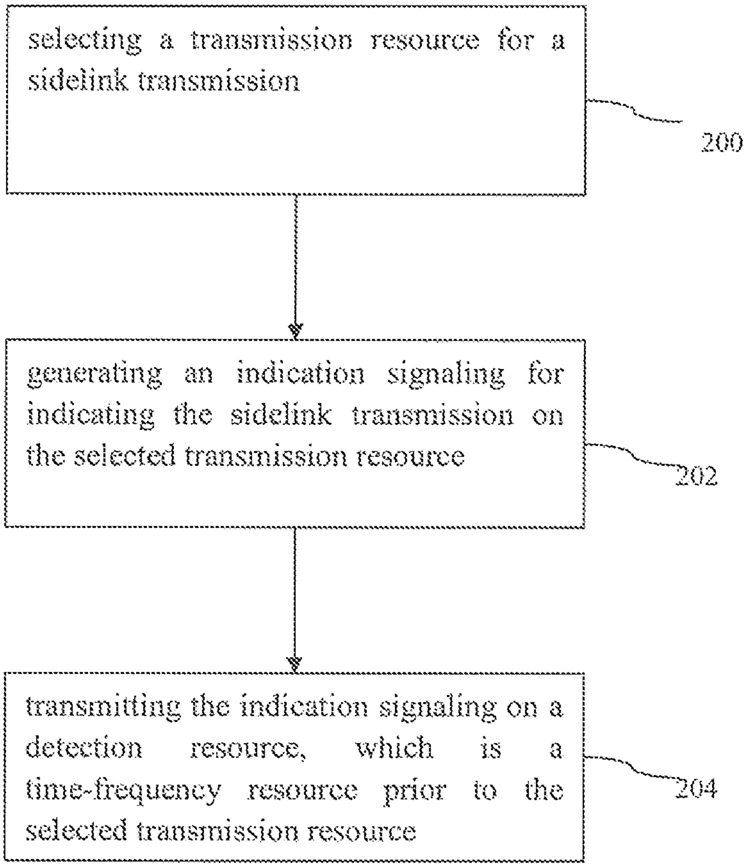
FIG. 2 is a flow chart illustrating a method for transmission resource selection according to an embodiment of the present disclosure.

FIG. 2 is a flow chart illustrating a method for transmission resource selection according to an embodiment of the present disclosure, which may be performed in the first UE.

As shown in FIG. 2, in step 200, the first UE, for example a first vehicle may select a transmission resource for a sidelink transmission based on a long term sensing to the transmission pool, wherein the sidelink transmission may include sidelink control information and data, and is not urgent. As persons skilled in the art can understand, the transmission resource may be a time-frequency resource in the transmission pool, and may be a slot or two slots.

In step 202, the first UE may generate an indication signaling for indicating the sidelink transmission on the selected transmission resource. The indication signaling may be in various forms and may include various indication information.

According to an embodiment of the present disclosure, the indication signaling may indicate at least one of the following indication information: a timing offset between the transmission of the indication signaling and the sidelink transmission, a frequency offset between the transmission of the indication signaling and the sidelink transmission, the priority of the sidelink transmission, and the transmission power of the sidelink transmission. For example, the indication signaling may only indicate the timing offset between the transmission of the indication signaling and the sidelink transmission, or only indicate the frequency offset between the transmission of the indication signaling and the sidelink transmission. In another example, the indication signaling may only indicate the priority of the sidelink transmission or the transmission power of the sidelink transmission when the timing offset between the transmission of the indication signaling and the sidelink transmission is fixed or preconfigured by the network side. In a further example, the indication signaling may indicate all of the timing offset between the transmission of the indication signaling and the sidelink transmission, the frequency offset between the transmission of the indication signaling and the sidelink transmission, the priority of the sidelink transmission, and the transmission power of the sidelink transmission.

In an embodiment of the present disclosure, the indication signaling may include a reference signaling sequence. For example, the reference signaling sequence may be a sounding reference signaling (SRS) or DMRS (Demodulation Reference Signal), wherein the indication information of the indication signaling may be implicitly included in reference signaling sequence. According to an embodiment of the present disclosure, the indication information, for example, the timing offset between the transmission of the indication signaling and the sidelink transmission may be associated with the order of the reference signaling sequence. Different orders of the reference signaling sequence present different indication information.

According to another embodiment of the present disclosure, the timing offset between the transmission of the indication signaling and the sidelink transmission may be fixed or preconfigured by the network side. That is, the timing offset between an indication signaling transmission and a sidelink transmission is known for all UEs in the V2X system. In that case, the indicating signaling may not indicate the timing offset between the transmission of the indication signaling and the sidelink transmission. The indicating signaling may be just shown as a power to indicate that the selected transmission resource is already occupied by the first UE, which may be any signal presenting a power. In an embodiment of the present disclosure, the indication signaling may include a copy of a part of the sidelink transmission, for example, the indication signaling may repeat a part of the control information or data of the sidelink transmission to present a power that indicates the selected transmission source is occupied. According to an embodiment of the present disclosure, the power may be associated with the priority of the sidelink transmission, for example, a high priority may be indicated by a high power.

In step 204, the first UE may transmit the indication signaling on a detection resource, which is a time-frequency resource prior to the selected transmission resource. In an embodiment of the present disclosure, the first UE may broadcast the indication signaling on the detection resource in the V2X system to inform all UEs in the V2X system. The detection resource may include at least one symbol, and may be one slot or two slots. For example, the first UE may transmit the indication signaling on the last symbol of the detection resource with one slot, or transmit the indication signaling on the last symbol of the detection with two slots.

Dependent on the contents and forms of the indication signalings, the first UE may transmit the indication signaling in different forms. For example, in the case that the indicating signaling is just shown as a power to indicate that the selected transmission resource is already occupied the first UE, the first UE may just transmit a power on the detection resource. According to an embodiment of the present disclosure, the power may be associated with the priority of the sidelink transmission, and the indication signaling indicating a high priority may be transmitted in a higher power than an indication signaling indicating a low priority. In the case that the indication signaling may include a copy of a part of the sidelink transmission, the first UE may transmit the indication signaling by transmitting the copy of a part of the control information or data of the sidelink transmission. The indication information may be a plurality of bits transmitted on the detection resource, for example, 2 bits for indicating 4 kinds of timing offsets, or, 3 or 4 bits for indicating 8 kinds of priority.

Regarding the second UE, it will perform a transmission resource selection for an urgent sidelink transmission, which means an urgent packet arrives at the physical layer according to an embodiment of the present disclosure. Since the sidelink transmission is urgent, the second UE cannot perform the transmission resource for the sidelink transmission in the same way to the first UE, which is mainly based on the long term sensing to the transmission pool.

Figure 3:
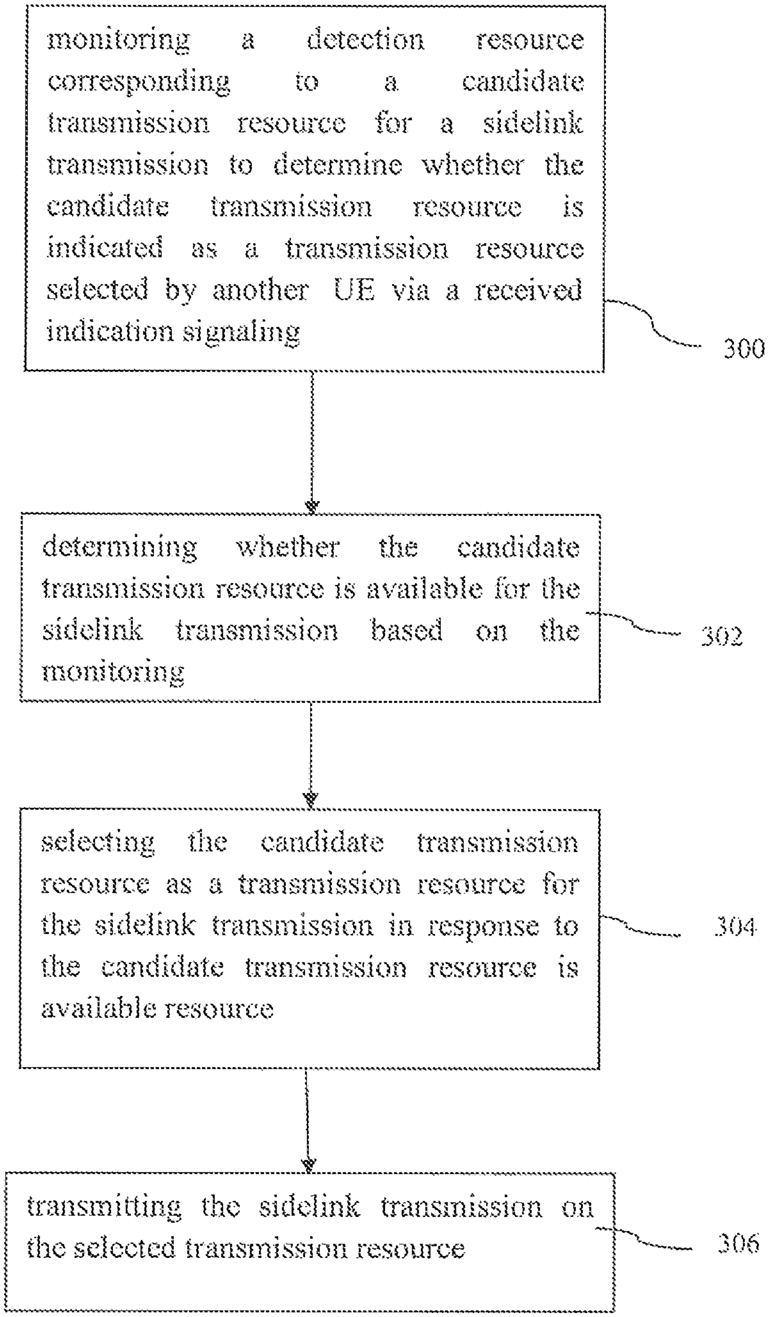
FIG. 3 is a flow chart illustrating a method for transmission resource selection according to another embodiment of the present disclosure.

FIG. 3 is a flow chart illustrating a method for transmission resource selection according to another embodiment of the present disclosure, which may be performed in the second UE.

As shown in FIG. 3, in step 300, the second UE may monitor a detection resource corresponding to a candidate transmission resource for an urgent sidelink transmission to determine whether the candidate transmission resource is indicated as a transmission resource selected by another UE via a received indication signaling. The detection resource may be a time-frequency resource prior to the candidate transmission resource, and the candidate transmission resource may be a time-frequency subsequent to the time-frequency resource where the urgent packet arrives.

According to an embodiment of the present disclosure, the second UE may monitor the detection source corresponding to the candidate transmission resource according to the timing offset between the transmission of the received indication signaling and the sidelink transmission on the transmission resource selected by the other UE. In another embodiment of the present disclosure, when the timing offset is fixed or preconfigured by the network side, the second UE may know the timing offset between the detection resource and the candidate transmission resource. In this case, the second UE can directly determine the timing offset between the detection resource and the candidate transmission resource. In this case, the second UE may first determine the candidate transmission resource for the urgent sidelink transmission, and the determine the detection resource for monitoring. While, when the timing offset is not fixed or preconfigured by the network side, the second UE may monitoring the detection resource nearest to the time-frequency resource wherein the urgent packet arrives. In this case, the second UE may first determine the detection resource for monitoring. For example, when the timing offset is fixed as "0," the second UE may determine the candidate transmission resource, and may monitor the prior time-frequency resource most adjacent to the candidate transmission resource as the detection resource corresponding to the candidate transmission resource.

Dependent on different forms of received indication signalings, the second UE may perform different monitoring behaviors, which may be a power detection on the detection resource or a decoding of the received indication signaling. For example, in an embodiment of the present disclosure, the second UE may detect the power of the detection resource when the received indication signaling is just a power, or when the received indication signaling includes a reference signaling sequence, a copy of a part of the sidelink transmission on the transmission resource selected by the other UE, for example the first UE, or a meaningless signal etc. In another embodiment of the present disclosure, the second UE may have to decode the indication signaling to read the indication information of the indication signaling. For example, the received indication signal may indicate at least one of the following indication information: the timing offset between the transmission of the received indication signaling and a sidelink transmission on the transmission resource selected by the other UE, the frequency offset between the transmission of the received indication signaling and the sidelink transmission on the transmission resource selected by the other UE, the priority of the sidelink transmission on the transmission resource selected by the other UE, and the transmission power of the sidelink transmission on the transmission resource selected by the other UE. In an embodiment of the present disclosure, the timing offset may be determined from the received indication signaling.

In step 302, the second UE may determine whether the candidate transmission resource is available for the sidelink transmission based on the monitoring. In an embodiment of the present disclosure, the monitoring may indicate that there is no indication signaling on the detection resource, and the second UE may determine the candidate resource is available. In another embodiment of the present disclosure, the monitoring, for example, decoding the indication signaling may indicate that the candidate resource is occupied by the other UE, for example the first UE, and the second UE may determine the candidate transmission resource is unavailable. According to a further embodiment of the present disclosure, the second UE may still determine the candidate transmission resource is available even when the monitoring indicates that is occupied by the other UE. For example, based on the monitoring, the second UE may find that the sidelink transmission to be performed by itself have a higher priority than the sidelink transmission on the transmission resource selected by the other UE, and then determine the occupied candidate transmission resource is available. In an embodiment of the present disclosure, the priority of a sidelink transmission may be associated with a power. The second UE may predefine a power threshold, and the pre-defined threshold is associated with the priority of the sidelink transmission. Based on the monitoring, the second UE may find that the power detected on the detection resource is lower than the pre-defined threshold, and may determine the candidate transmission resource is available.

Then in step 304, the second UE may select the candidate transmission resource as a transmission resource for the sidelink transmission in response to the candidate transmission resource is available.

According to an embodiment of the present disclosure, based on the monitoring, the second UE may determine the candidate transmission resource is unavailable. The second UE may directly select the time-frequency resource subsequent to the candidate transmission resource as the transmission resource for the urgent sidelink transmission.

According to another embodiment of the present disclosure, after selecting the transmission resource for the urgent sidelink transmission, the second UE may also generate an indication signaling in a similar way to the first UE, and transmit the indication signaling to inform other UEs that the selected transmission resource has been occupied by the second UE.

In step 306, the second UE may transmit the sidelink transmission on the selected resource.

As illustrated above, according to embodiments of the present disclosure, UEs that will transmit un-urgent V2X service, such as the first UE, may select a transmission resource for the un-urgent sidelink transmission based on a long term sensing to the transmission pool, and transmits an indication signaling on a detection resource to inform other UEs the selected transmission resource. On the other hand, UEs that will transmit urgent V2X service, such as the second UE, may select a transmission resource for the urgent sidelink transmission based on monitoring the detection resource corresponding to the candidate transmission resource, rather than based on a long term sensing to the transmission pool. Thus, UEs that will transmit urgent V2X service can select the transmission resource for the urgent sidelink transmission within very short time, which will greatly reduce the latency caused by transmission resource selection in a V2X system.

Figure 4:
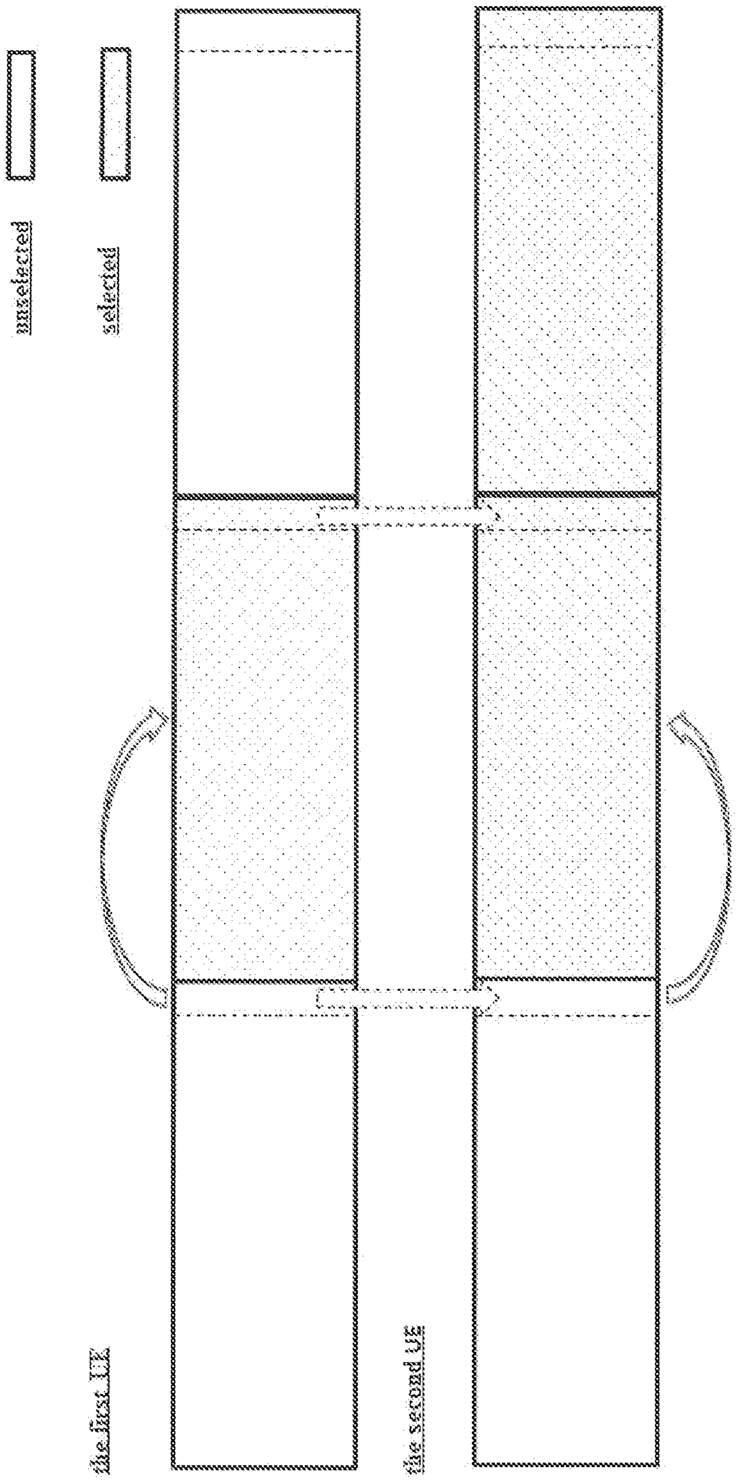
FIG. 4 graphically depicts an implementation of transmission resource selection in a V2X system according to an embodiment of the present disclosure.

FIG. 4 graphically depicts an implementation of transmission resource selection in a V2X system according to an embodiment of the present disclosure, wherein an example of transmission resource selection for un-urgent V2X services and an example of transmission resource selection for urgent V2X services according to an embodiment of the present disclosure are illustrated.

Specifically, according to an embodiment of the present disclosure, a transmission resource selection scenario in a V2X system is proposed in FIG. 4, wherein at least two UEs, such as a first UE and a second UE operate in the V2X system. The first UE, for example a vehicle will select a transmission resource for a sidelink transmission providing un-urgent V2X services, while the second UE, for example another vehicle will select a transmission resource for a sidelink transmission providing urgent V2X services, such as a pre-crash warning message.

In an embodiment of the present disclosure, the first UE may select a transmission resource for the un-urgent sidelink transmission based on a long term sensing to the transmission pool, which is similar to that provided in LTE Rel.14. For simplicity and clarity, only three time-frequency resources are shown in FIG. 4. Each time-frequency resource may include at least one symbol, and may be one slot or two slots. Furthermore, although two transmission pools respectively including three time-frequency resources are provided for the first UE and second UE in FIG. 4, persons skilled in the art know that the first UE and the second UE will select the transmission resources from the same transmission pool.

As shown in FIG. 4, the first UE may select the second time-frequency resource as the transmission resource for the un-urgent sidelink transmission. To inform other UEs in the V2X system, the first UE may generate an indication signaling for indicating the un-urgent sidelink transmission on the selected transmission resource. The indication signaling may be in various forms and may include various indication information.

Then, according to an embodiment of the present disclosure, the first UE may transmit the indication signaling on a detection resource, which is a time-frequency resource prior to the selected transmission resource. In an embodiment of the present disclosure, the first UE may broadcast the indication signaling on the detection resource in a V2X system to inform all UEs in the V2X system. As shown in FIG. 4, the first UE may transmit the indication signaling on the last symbol of the detection resource, and the detection resource is the prior time-frequency resource most adjacent to the selected transmission resource, that is the first time-frequency resource in FIG. 4. That also means the timing offset between the timing offset between the transmission of the indication signaling and the sidelink transmission is zero, which can be fixed or preconfigured by the network side. According to an embodiment of the present disclosure, the first UE may indicate the timing offset in the indication signaling, which may be variable for different transmission resource selections.

Regarding the second UE, it will perform a transmission resource selection for an urgent sidelink transmission according to an embodiment of the present disclosure. The urgent sidelink transmission to be performed in the second UE happens after the first UE selects the transmission resource for the un-urgent sidelink service.

According to embodiment of the present disclosure, the second UE may monitor a detection resource corresponding to the candidate transmission resource for the urgent sidelink transmission to determine whether the candidate transmission resource is indicated as a transmission resource selected by another UE via a received indication signaling. In an embodiment of the present disclosure, the timing offset between the transmission of the received indication signaling and a sidelink transmission on the transmission resource selected by the other UE may be fixed or preconfigured by the network side. UEs in the V2X system can directly determine the detection resource corresponding to the candidate transmission resource based on the known timing offset. For example, as shown in FIG. 4, the packet arrives the physical layer in the first time-frequency resource, the second UE may determine the first time-frequency resource is the detection source, and the candidate transmission resource is the second time-frequency resource for the urgent sidelink transmission. That is, the timing offset may be zero in the embodiment shown in FIG. 4 as stated above.

Dependent on different forms of received indication signalings, the second UE may perform different monitoring behaviors, which may be a power detection on the detection resource or a decoding of the received indication signaling. For example, in an embodiment of the present disclosure, the second UE may detect the power of the detection resource when the received indication signaling is just a power, or when the received indication signaling includes a reference signaling sequence, a copy of a part of the un-urgent sidelink transmission, or a meaningless signal etc. In another embodiment of the present disclosure, the second UE may have to decode the indication signaling to read the indication information of the indication signaling. For example, the received indication signal may indicate at least one of the following indication information: the timing offset between the transmission of the received indication signaling and the un-urgent sidelink transmission, frequency offset between the transmission of the received indication signaling and the un-urgent sidelink transmission, the priority of the un-urgent sidelink transmission, and the transmission power of the un-urgent sidelink transmission.

In an embodiment of the present disclosure, the second UE may determine whether the candidate transmission resource is available for the urgent sidelink transmission based on the monitoring. As shown in FIG. 4, after monitoring the detection resource, i.e., the first time-frequency resource, the second UE may find that the candidate transmission resource, i.e., the second time-frequency resource has been occupied by the first UE. The second UE may determine the candidate transmission resource is unavailable based on the monitoring, and determine the third time-frequency resource, which is subsequent to the second time-frequency resource as the selected transmission resource for the urgent sidelink transmission.

In an embodiment of the present disclosure, the second UE may still determine the second time-frequency resource is available even when the monitoring indicates that is occupied by the first UE. For example, based on the monitoring, the second UE may find that the urgent sidelink transmission to be transmitted on the candidate transmission resource has a higher priority than the un-urgent sidelink transmission, and then determine the occupied candidate transmission resource is available. In an embodiment of the present disclosure, the priority of a sidelink transmission may be associated with a power. The second UE may predefine a power threshold, and the pre-defined threshold is associated with the priority of the sidelink transmission. Based on the monitoring, the second UE may find that the power detected on the first time-frequency resource is lower than the pre-defined threshold, and may determine the second time-frequency resource is available.

Then the second UE may select the candidate resource as a transmission resource for the urgent sidelink transmission in response to the candidate resource is available and transmit the urgent sidelink transmission on the selected transmission resource, i.e., the second time-frequency resource.

According to an embodiment of the present disclosure, after selecting the transmission resource for the sidelink transmission, the second UE may also generate an indication signaling in a similar way to the first UE, and transmit the indication signaling to inform other UEs that the selected transmission resource has been occupied.

Figure 5:
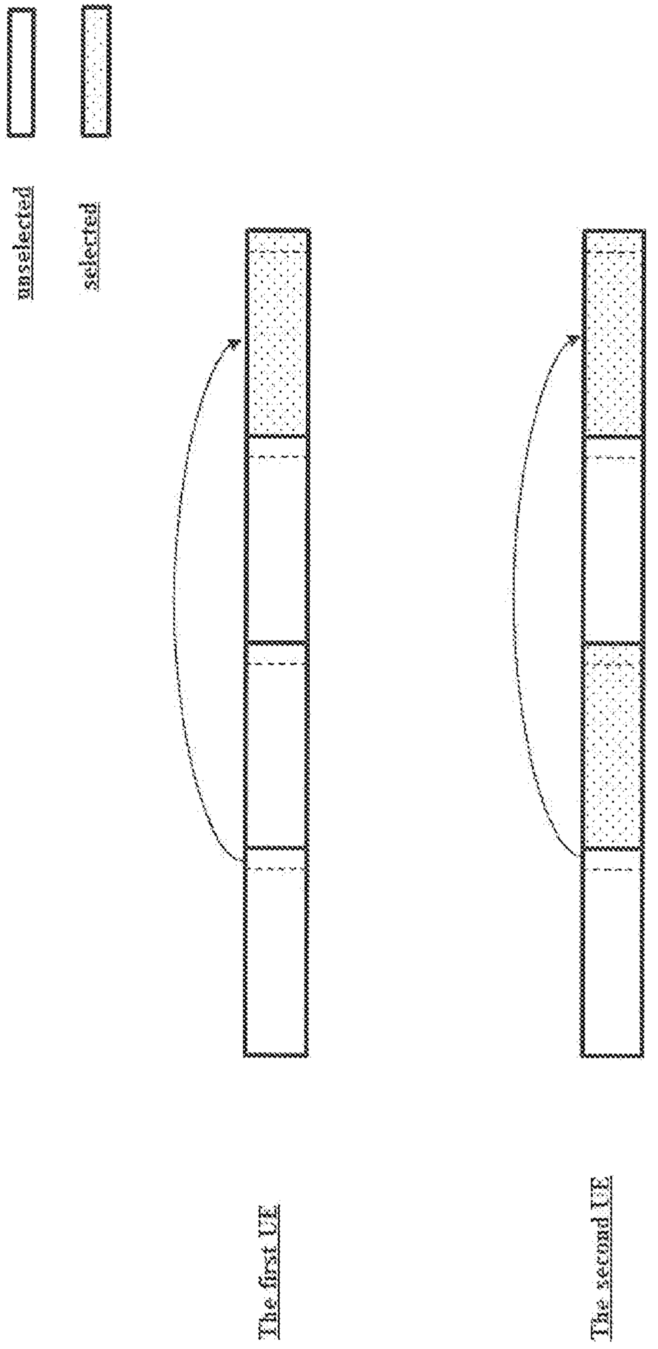
FIG. 5 graphically depicts an implementation of transmission resource selection in a V2X system according to another embodiment of the present disclosure.

FIG. 5 graphically depicts an implementation of transmission resource selection in a V2X system according to another embodiment of the present disclosure, wherein an example of transmission resource selection for un-urgent V2X services and an example of transmission resource selection for urgent V2X services according to an embodiment of the present disclosure are illustrated.

Specifically, according to an embodiment of the present disclosure, a transmission resource selection scenario in a V2X system is proposed in FIG. 5, wherein at least two UEs, such as a first UE and a second UE operate in the V2X system. The first UE, for example a vehicle will select a transmission resource for a sidelink transmission providing un-urgent V2X services, while the second UE, for example another vehicle will select a transmission resource for a sidelink transmission providing urgent V2X services. For simplicity and clarity, only four time-frequency resources are shown in FIG. 5. Each time-frequency resource may include at least one symbol, and may be one slot or two slots. Furthermore, although two transmission pools respectively including three time-frequency resources are provided for the first UE and second UE in FIG. 5, persons skilled in the art know that the first UE and the second UE will select the transmission resources from the same transmission pool.

As shown in FIG. 5, the first UE may select the fourth time-frequency resource as the transmission resource for the un-urgent sidelink transmission based on a long term sensing to the transmission pool, which is similar to that provided in LTE Rel.14. To inform other UEs in the V2X system, the first UE may generate an indication signaling for indicating the un-urgent sidelink transmission on the selected transmission resource. The indication signaling may be in various forms and may include various indication information.

Then, as shown in FIG. 5, the first UE may transmit the indication signaling on a detection resource, which is the first time-frequency resource in this embodiment. More specifically, the first UE may transmit the indication signaling on the last symbol of the detection resource. That is, the timing offset between the timing offset between the transmission of the indication signaling and the sidelink transmission is a time interval of 3 time-frequency resources, which can be fixed or preconfigured by the network side. According to an embodiment of the present disclosure, the first UE may indicate the timing offset in the indication signaling, which may be variable for different transmission resource selections.

Regarding the second UE, it will perform a transmission resource selection for an urgent sidelink transmission according to an embodiment of the present disclosure. The urgent sidelink transmission to be performed in the second UE happens after the first UE selects the transmission resource for the un-urgent sidelink service.

According to embodiment of the present disclosure, the second UE may monitor a detection resource corresponding to a candidate transmission resource for a sidelink transmission to determine whether the candidate transmission resource is indicated as a transmission resource selected by another UE via a received indication signaling. As shown in FIG. 5, the packet arrives the physical layer in the first time-frequency resource, preferably, the second UE may determine the detection resource is the first time-frequency resource, and the candidate transmission resource is the second time-frequency resource. Based on the monitoring, the second UE may determine that the timing offset indicated in the detection resource discloses the fourth time-frequency resource is occupied and the second time-frequency resource is un-occupied.

Dependent on different forms of received indication signalings, the second UE may perform different monitoring behaviors, which may be a power detection on the detection resource or a decoding of the received indication signaling. For example, in an embodiment of the present disclosure, the second UE may detect the power of the detection resource when the received indication signaling is just a power, or when the received indication signaling includes a reference signaling sequence, a copy of a part of the un-urgent sidelink transmission, or a meaningless signal etc. In another embodiment of the present disclosure, the second UE may have to decode the indication signaling to read the indication information of the indication signaling. For example, the received indication signal may indicate at least one of the following indication information: the timing offset between the transmission of the received indication signaling and the un-urgent sidelink transmission, frequency offset between the transmission of the received indication signaling and the un-urgent sidelink transmission, the priority of the un-urgent sidelink transmission, and the transmission power of the un-urgent sidelink transmission.

In an embodiment of the present disclosure, the second UE may determine whether the candidate transmission resource is available for the urgent sidelink transmission based on the monitoring. As shown in FIG. 5, after monitoring the detection resource, i.e., the first time-frequency resource, the second UE may not find any indicating signaling on the candidate transmission resource. Accordingly, the second UE may determine the candidate transmission resource is available based on the monitoring, and select the candidate transmission resource as the transmission resource for the urgent sidelink transmission. Considering, the time interval between the packet arrival and the selected transmission resource is very short, it is no need to generate and transmit an indication signal to inform other UEs the selected transmission resource.

The method of the present disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in FIGS. 2 and 3 may be used to implement the processor functions of this disclosure.

For example, in an embodiment of the present disclosure, an apparatus may include a processor, which is configured to perform a method of transmission resource selection for un-urgent sidelink transmission according to an embodiment of the present disclosure. In another embodiment of the present disclosure, an apparatus may include a processor, which is configured to perform a method of transmission resource selection for urgent sidelink transmission according to an embodiment of the present disclosure.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each FIG. are not necessary for operation of the disclosed embodiments. For example, persons of ordinary skill in the art of the disclosed embodiments would be enabled to make use of the teachings of the present disclosure by simply employing the elements of the independent claims. Accordingly, embodiments of the present disclosure as set forth herein are intended to be illustrative, not limiting. Various changes may be made without departing from the spirit and scope of the present disclosure.

What is claimed is:

1. A method of a first user equipment, the method comprising:

determining whether a sidelink transmission is urgent;

in response to determining that the sidelink transmission is not urgent, selecting a transmission resource for the sidelink transmission based on long term sensing of a transmission pool;

in response to determining that the sidelink transmission is urgent, selecting the transmission resource for the sidelink transmission based on determining whether the transmission resource is indicated as being previously selected by another user equipment;

generating an indication signaling for indicating the sidelink transmission on the selected transmission resource; and transmitting the indication signaling on a detection resource different from the transmission resource from the first user equipment to a second user equipment, wherein the detection resource is a time-frequency resource prior to the selected transmission resource, a timing offset defines a time between the detection resource and the selected transmission resource, and the offset time is fixed or preconfigured by a network side.

2. The method according to claim 1, further comprising transmitting the indication signaling on the last symbol of the detection resource.

3. The method according to claim 1, wherein the indication signaling indicates the timing offset, a frequency offset between the transmission of the indication signaling and the sidelink transmission, the priority of the sidelink transmission, the transmission power of the sidelink transmission, or some combination thereof.

4. The method according to claim 1, wherein the indication signaling comprises a reference signaling sequence.

5. The method according to claim 1, wherein transmitting the indication signaling further comprises transmitting a copy of a part of the sidelink transmission on the detection resource.

6. An apparatus comprising a first user equipment, the apparatus further comprising:

a processor that:

determines whether a sidelink transmission is urgent in response to determining that the sidelink transmission is not urgent, selects a transmission resource for the sidelink transmission based on long term sensing of a transmission pool;

in response to determining that the sidelink transmission is urgent, selects the transmission resource for the sidelink transmission based on determining whether the transmission resource is indicated as being previously selected by another user equipment; and generates an indication signaling for indicating the sidelink transmission on the selected transmission resource; and a transmitter that transmits the indication signaling on a detection resource different from the transmission resource from the first user equipment to a second user equipment, wherein the detection resource is a time-frequency resource prior to the selected transmission resource, a timing offset defines a time between the detection resource and the selected transmission resource, and the offset time is fixed or preconfigured by a network side.

7. The apparatus of claim 6, wherein the transmitter transmits the indication signaling on the last symbol of the detection resource.

8. The apparatus of claim 6, wherein the indication signaling indicates the timing offset, a frequency offset between the transmission of the indication signaling and the sidelink transmission, the priority of the sidelink transmission, the transmission power of the sidelink transmission, or some combination thereof.

9. The apparatus of claim 6, wherein the indication signaling comprises a reference signaling sequence.

10. The apparatus of claim 6, wherein the transmitter transmitting the indication signaling further comprises the transmitter transmitting a copy of a part of the sidelink transmission on the detection resource.

* * * * *